(12) United States Patent
Woodman et al.

(10) Patent No.: US 10,768,508 B1
(45) Date of Patent: Sep. 8, 2020

(54) INTEGRATED SENSOR-OPTICAL COMPONENT ACCESSORY FOR IMAGE CAPTURE DEVICE

(71) Applicant: GoPro, Inc., San Mateo, CA (US)

(72) Inventors: Nicholas D. Woodman, Woodside, CA (US); Ingrid A. Cotoros, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/427,612

(22) Filed: May 31, 2019

Related U.S. Application Data

(60) Provisional application No. 62/829,275, filed on Apr. 4, 2019.

(51) Int. Cl.
| | |
|---|---|
| *G03B 7/26* | (2006.01) |
| *G03B 17/08* | (2006.01) |
| *H04N 5/232* | (2006.01) |
| *H04N 5/225* | (2006.01) |
| *G03B 17/56* | (2006.01) |

(Continued)

(52) U.S. Cl.
CPC ............... *G03B 7/26* (2013.01); *G03B 17/08* (2013.01); *G03B 17/14* (2013.01); *G03B 17/565* (2013.01); *H04N 5/2254* (2013.01); *H04N 5/23216* (2013.01); *H04N 5/247* (2013.01); *H04N 5/23238* (2013.01)

(58) Field of Classification Search
None
See application file for complete search history.

(56) References Cited

U.S. PATENT DOCUMENTS

| | | | |
|---|---|---|---|
| 7,102,686 B1* | 9/2006 | Orimoto | G03B 35/08 |
| | | | 348/375 |
| 10,359,516 B2* | 7/2019 | Liu | H04N 5/2257 |
| 10,530,982 B2* | 1/2020 | Daulton | H04M 1/0256 |

(Continued)

FOREIGN PATENT DOCUMENTS

WO 2017106102 A1 6/2017

OTHER PUBLICATIONS

International Search Report and Written Opinion for App No. PCT/US2020/017440, dated May 12, 2020, 10 pages.

*Primary Examiner* — William B Perkey
(74) *Attorney, Agent, or Firm* — Young Basile Hanlon & MacFarlane, P.C.

(57) ABSTRACT

An image capture system includes an image capture device and an integrated sensor-optical component accessory. The integrated sensor-optical component accessory is releasably connectable to the image capture device and includes identification data. A processor in the image capture device configures itself and the image capture device based on the identification data. Image data from the integrated sensor-optical component accessory is processed and image data from the image capture data is either processed or ignored depending on the configuration. In an implementation, attachment information may also be used for configuration. In an implementation, multiple integrated sensor-optical component accessories may be connected to the image capture device. In an implementation, the center axis of the fields of view of the image capture device and the integrated sensor-optical component accessory may be in different directions or the same direction, and the fields of view may be overlapping or non-overlapping.

20 Claims, 14 Drawing Sheets

(51) Int. Cl.
*H04N 5/247* (2006.01)
*G03B 17/14* (2006.01)

(56) References Cited

U.S. PATENT DOCUMENTS

| | | | | |
|---|---|---|---|---|
| 2007/0147827 | A1* | 6/2007 | Sheynman | G03B 29/00 |
| | | | | 396/325 |
| 2007/0230950 | A1* | 10/2007 | Huang | G03B 17/14 |
| | | | | 396/541 |
| 2007/0268371 | A1* | 11/2007 | Misawa | H04N 5/23203 |
| | | | | 348/207.99 |
| 2008/0088727 | A1* | 4/2008 | Nagata | G03B 17/18 |
| | | | | 348/333.01 |
| 2011/0110654 | A1* | 5/2011 | Maki | H04N 5/2251 |
| | | | | 396/49 |
| 2013/0141640 | A1* | 6/2013 | Kim | G03B 17/02 |
| | | | | 348/375 |
| 2014/0300809 | A1* | 10/2014 | Oliveira | H04N 5/2254 |
| | | | | 348/376 |
| 2015/0334258 | A1* | 11/2015 | O'Neill | H04N 1/00 |
| | | | | 348/207.1 |
| 2016/0006920 | A1* | 1/2016 | Gomes Da Motta | |
| | | | | H04N 5/2257 |
| | | | | 348/207.11 |
| 2016/0134793 | A1* | 5/2016 | Samanta | H04N 5/23216 |
| | | | | 348/222.1 |
| 2016/0286119 | A1* | 9/2016 | Rondinelli | H04N 5/2254 |
| 2017/0048431 | A1* | 2/2017 | Yu | G02B 7/10 |
| 2017/0339329 | A1 | 11/2017 | Lee | |
| 2018/0052308 | A1* | 2/2018 | Kong | G03B 37/00 |
| 2018/0224718 | A1 | 8/2018 | Ota | |
| 2019/0230283 | A1* | 7/2019 | Ollier | H04N 5/2254 |
| 2019/0306420 | A1* | 10/2019 | Okaki | H04N 5/2254 |

* cited by examiner

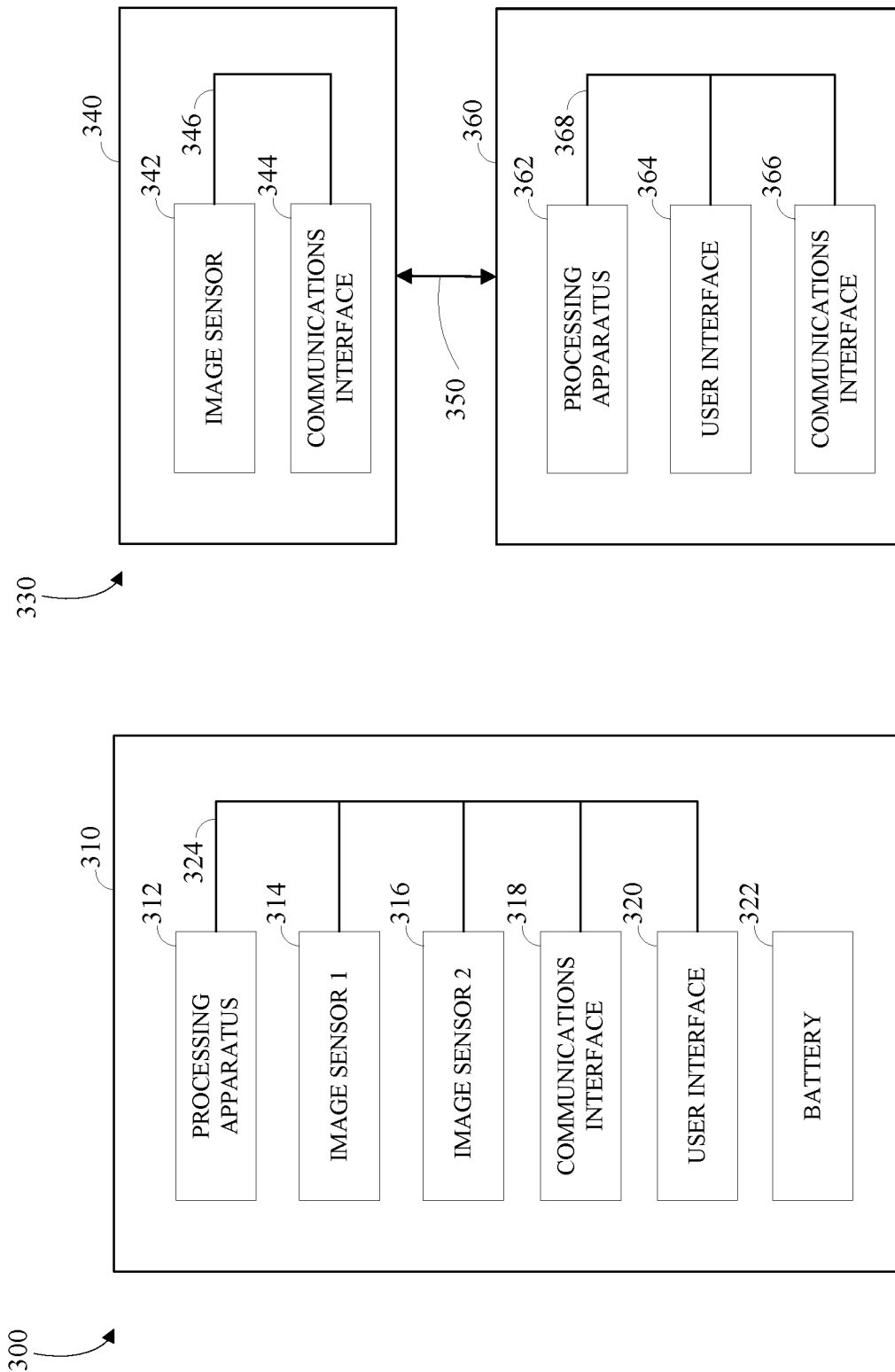

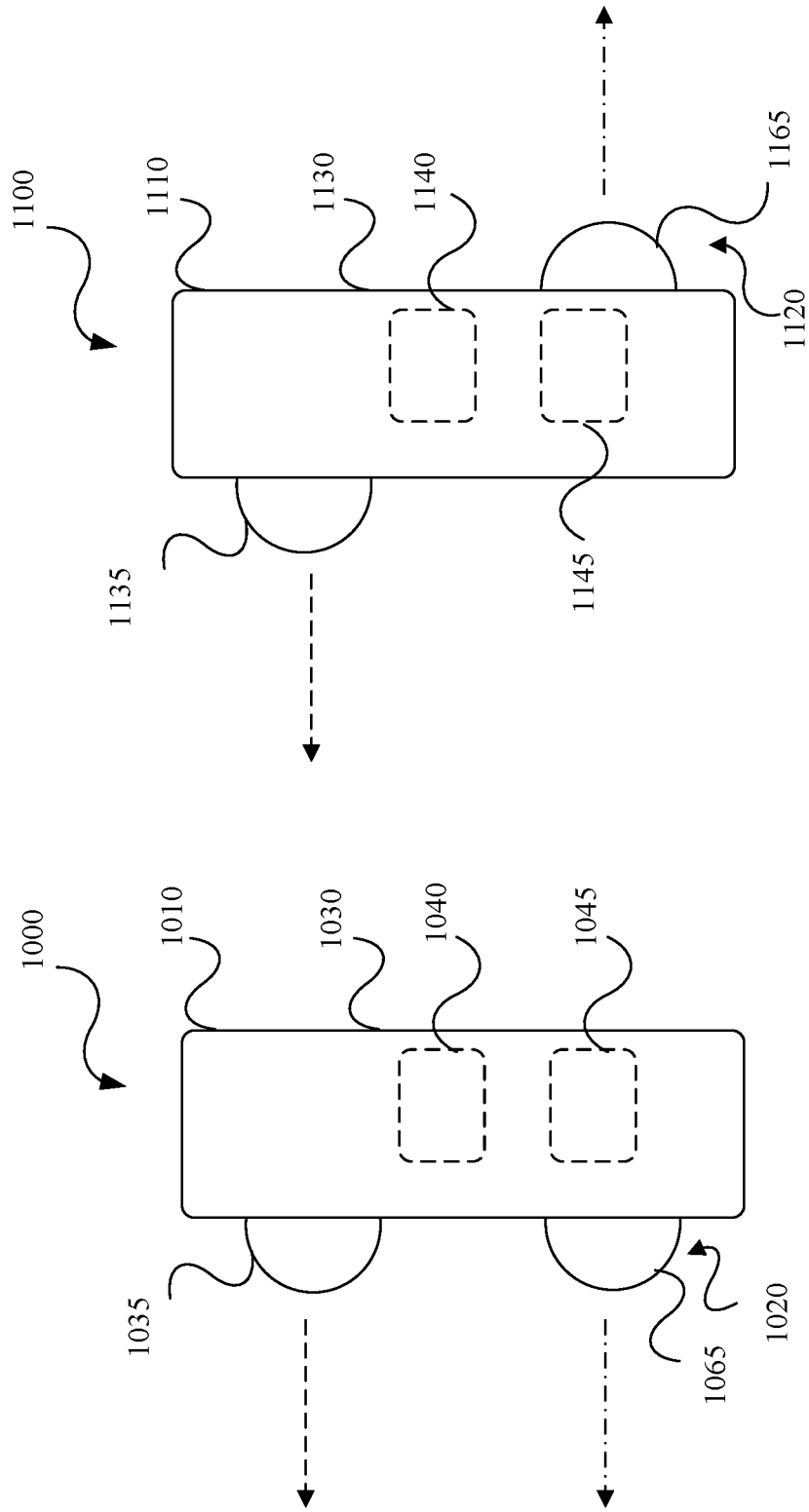

INTEGRATED SENSOR-OPTICAL COMPONENT ACCESSORY FOR IMAGE CAPTURE DEVICE

CROSS REFERENCE TO RELATED APPLICATION(S)

This application claims the benefit of U.S. Provisional Application No. 62/829,275, filed on Apr. 4, 2019, the contents of which are incorporated by reference herein in its entirety.

TECHNICAL FIELD

This disclosure relates to image capture devices, in particular, integrated sensor-optical component accessories for image capture devices.

BACKGROUND

Image capture devices are used in various applications including, for example, hand-held cameras and video recorders, drones, and vehicles. Image capture devices typically include one or more optical elements, e.g., lenses, as well as one or more image sensors, image signal processors, encoders, or combinations thereof to capture and process image data. More specifically, the optical element(s) capture content by receiving and focusing light via, and the captured content is converted to an electronic image signal by the image sensor. The image signal generated by the image sensor is then processed by an image signal processor to form an image, which may be stored and/or encoded.

Many image capture devices are fixed in terms of functionality. For example, each of the fixed optical elements included in an image capture device has an associated field-of-view that extends in lateral and longitudinal directions. There is no mechanism for re-configuring the functionality of the original image capture device.

SUMMARY

Disclosed herein are implementations of integrated sensor-optical component accessories for image capture devices. An image capture system includes an image capture device and an integrated sensor-optical component accessory. The integrated sensor-optical component accessory is releasably connectable to the image capture device and includes integrated sensor-optical component accessory identification data. A processor in the image capture device configures itself and the image capture device based on the integrated sensor-optical component accessory identification data. Image data from the integrated sensor-optical component accessory is processed and image data from the image capture data is either processed or ignored depending on the configuration. In an implementation, attachment information may also be used for configuration. In an implementation, multiple integrated sensor-optical component accessories may be connected to the image capture device. In an implementation, the center axis of the fields of view of the image capture device and the integrated sensor-optical component accessory may be in different directions or the same direction, and the fields of view may be overlapping or non-overlapping.

In an implementation, an image capturing system includes an integrated sensor-optical component accessory and an image capturing device. The integrated sensor-optical component accessory and an image capturing device both capable of capturing image information. The image capturing device includes a body, an image sensor internal to the body, an optical component structured on the body, and a processor configured to process selected image information. The image capturing device and the processor are configurable based on identification data received from the integrated sensor-optical component accessory when the integrated sensor-optical component accessory is releasably attached to the image capturing device. In an implementation, the selected image information is based on the identification data.

In an implementation, an image capturing apparatus includes an image capturing device and an integrated sensor-optical component accessory. The integrated sensor-optical component accessory and an image capturing device both capable of capturing image information. The image capturing device includes an image sensor, an optical component, a processor for processing selectable image information, and a first mounting structure. The integrated sensor-optical component accessory includes an image sensor, an optical component fixed in relation to the image sensor, and a second mounting structure. The processor is configurable based on identification data received from the integrated sensor-optical component accessory and attachment information when the integrated sensor-optical component accessory is releasably attached to the image capturing device using at least the first mounting structure and the second mounting structure. In an implementation, the selected image information is based on the identification data and the attachment data.

In an implementation, a method of using an image capturing system. The method includes releasably attaching an integrated sensor-optical component accessory to an image capturing device. The image capture device receiving integrated sensor-optical component accessory control information from the integrated sensor-optical component accessory. The integrated sensor-optical component accessory control information being different for different integrated sensor-optical component accessories. A processor in the image capture device and the image capture device being configurable based on the integrated sensor-optical component accessory control information and processing selected image data based on the integrated sensor-optical component accessory control information.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems.

FIG. 10 is a side view of a diagram of an image capture system including an image capture device with an attached integrated sensor-optical component accessory in accordance with embodiments of this disclosure.

FIG. 11 is a side view of a diagram of an image capture system including an image capture device with an attached integrated sensor-optical component accessory in opposing directions in accordance with embodiments of this disclosure.

DETAILED DESCRIPTION

Figure 1A:
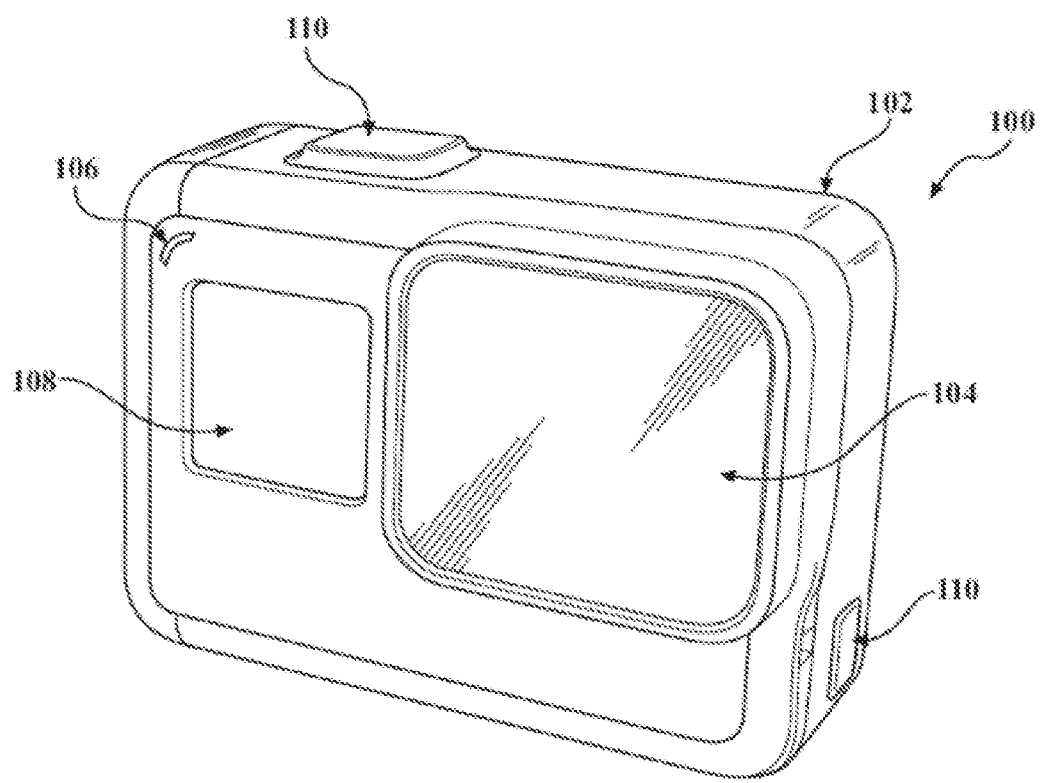
FIGS. 1A-D are isometric views of an example of an image capture device.

Disclosed herein are implementations of integrated sensor-optical component accessories for image capture devices. The integrated image sensor-optical component accessories include an image sensor and an optical component that may be coupled to each other in a precisely determined spatial or fixed arrangement to optimize the image sensor and optical component pairing. In an implementation, the optical component is a lens or multiple lenses. In an implementation, the image sensors in the image capture modules are maintained inside environmentally proof housings, such as for example, waterproof housings. The image capture device includes an on-board image sensor and optical component for collectively capturing image information and a processor for processing the image information. The integrated sensor-optical component accessory is releasably attachable to the image capture device. The processor may support multiple integrated sensor-optical component accessories and may be configurable based identification provided by the integrated sensor-optical component accessory. The processor may configure itself and operation or functionality of the image capture device based on the image sensor, lens, field of view, and other like features or characteristics of the integrated sensor-optical component accessory. In an implementation, the processor may configure itself and operation or functionality of the image capture device based on where and how the integrated sensor-optical component accessory is attached to the image capture device.

In an implementation, the image capture device and the integrated sensor-optical component accessory may include mounting structures that may provide releasable mechanical coupling and electrical connectivity. In an implementation, the electrical connectivity may be used to provide power and facilitate the transfer of data between the image capture device and the integrated sensor-optical component accessory. In an implementation, the data may include image data and identification information from the integrated sensor-optical component accessory. In an implementation, the data may be transmitted wirelessly between the image capture module and the integrated sensor-optical component accessory.

Each of the integrated sensor-optical component accessories may be configured to provide image capture functions differently from each other, such as by having different resolutions, light sensitivities, frame rates, fields of view, and/or fixed or variable focal lengths. As a result, the image capture device may, by coupling different ones of the integrated sensor-optical component accessories to the image capture device, provide different image capture functions. In an implementation, the processor may configure image processing of image information from an attached integrated sensor-optical component accessory instead of on-board or fixed image sensor and optical component of the image capture device. In an implementation, the processor may configure image processing of image information from both an attached integrated sensor-optical component accessory and an on-board or fixed image sensor and optical component of the image capture device. In an implementation, different fields-of-view and perspectives may be configured using both an attached integrated sensor-optical component accessory and an on-board or fixed image sensor and optical component of the image capture device. Advantageously, a user of the image capture device may thereby be provided with added functionality, improved quality, reduced complexity, and/or reduced cost as compared to other cameras (e.g., the digital point-and-shoot cameras and the single-lens reflex cameras described above).

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
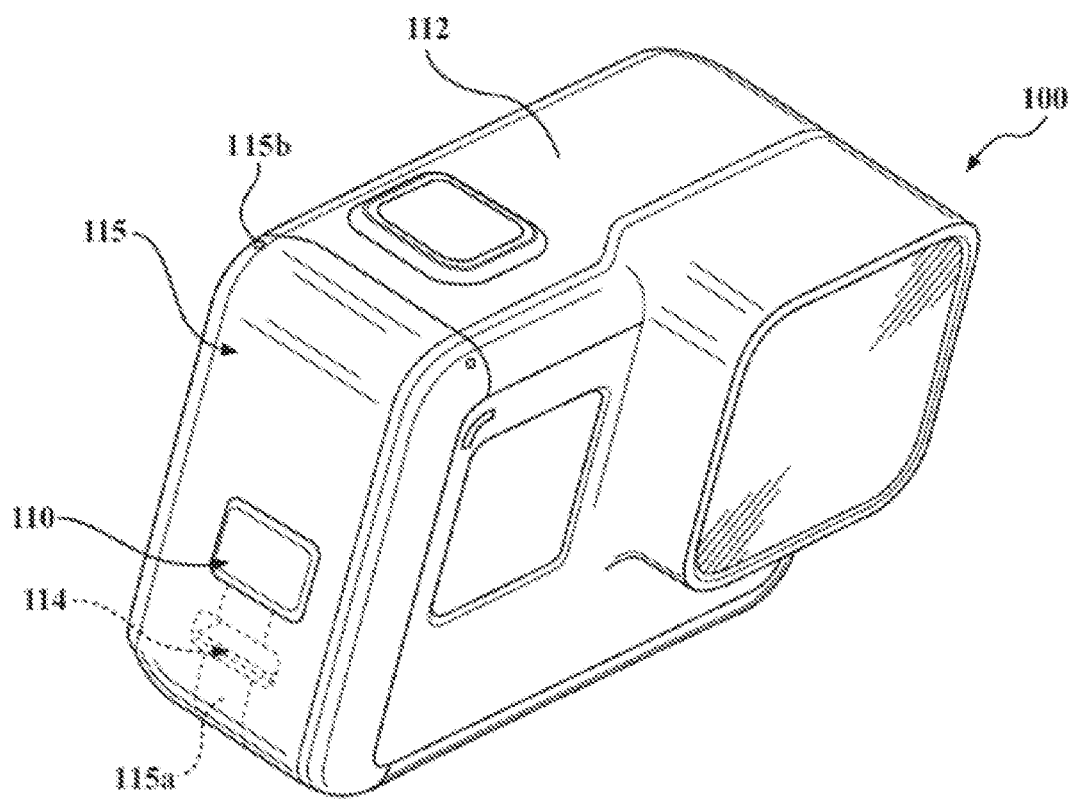
Figure 1C:
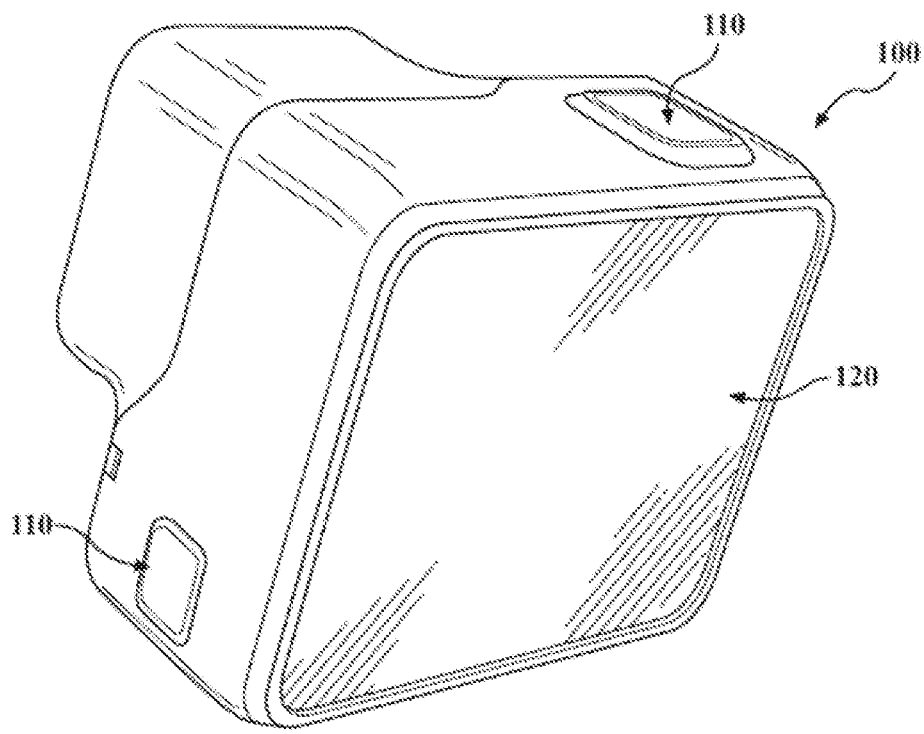
Figure 1D:
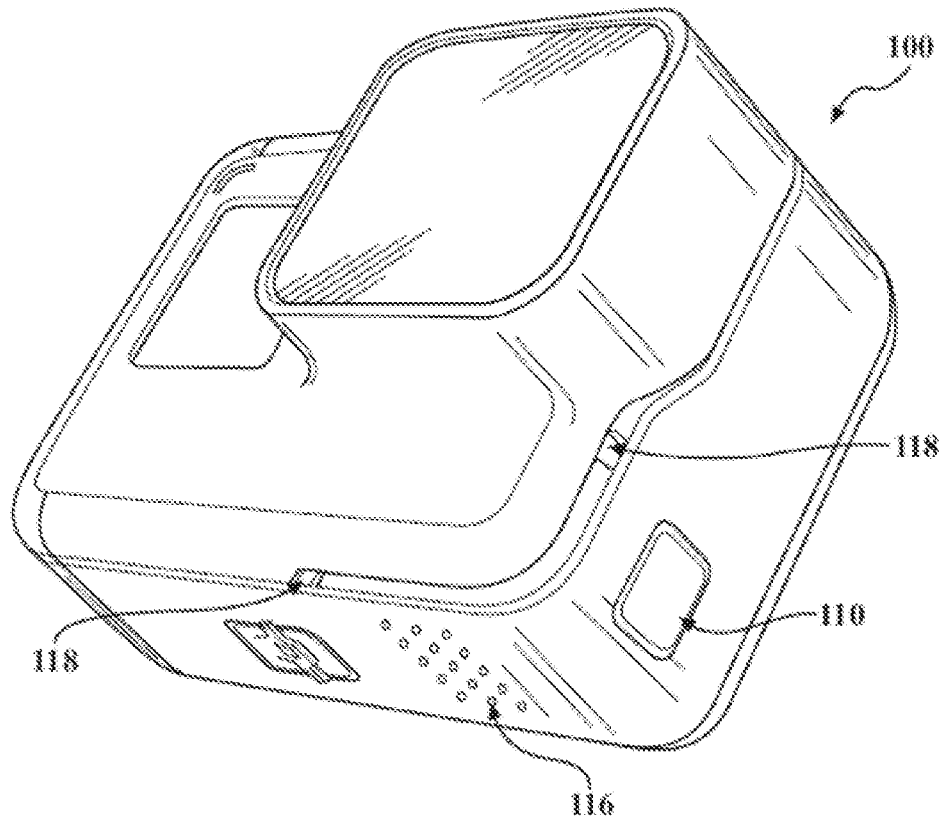

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable imaging modules, cold shoes, or hot shoes that add functional accessories, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 12:
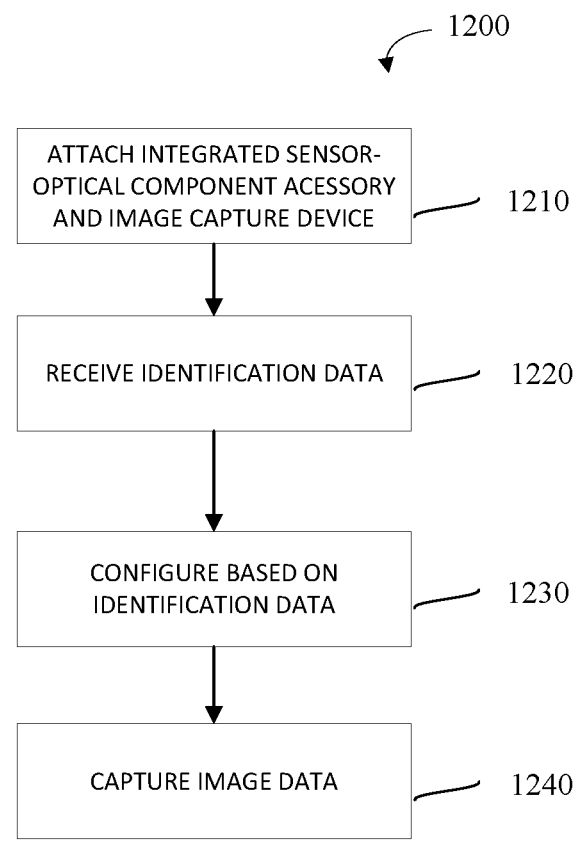
FIG. 12 is flowchart of an example of a process for attaching an integrated sensor-optical component accessory to an image capture device in accordance with embodiments of this disclosure.

The image capture device 100 may be modular and/or configurable using the implementations described in this disclosure, such as the embodiments and implementations described in FIGS. 5-11 and may be used to implement some or all of the techniques described in this disclosure, such as the technique described in FIG. 12.

Figure 2A:
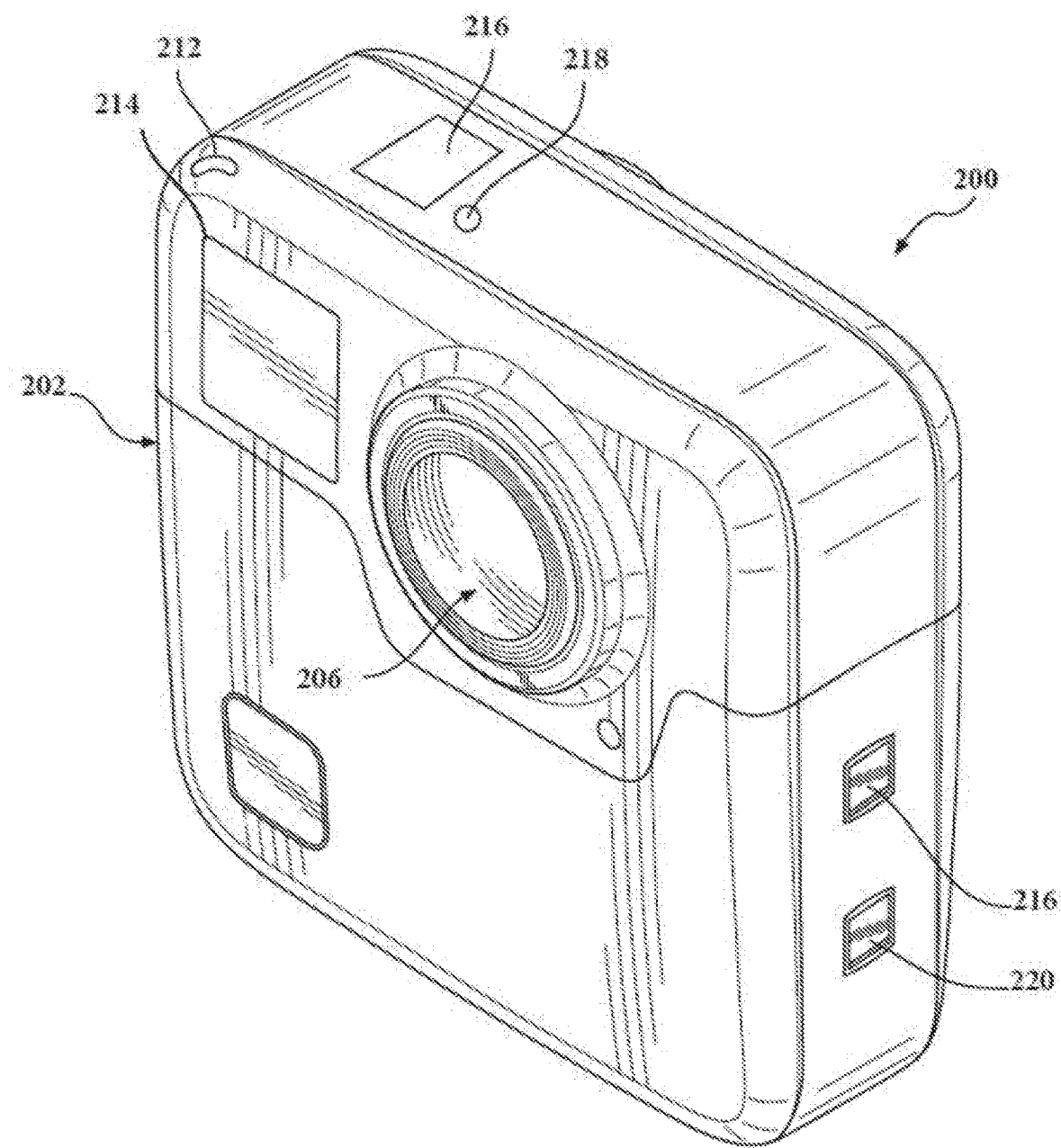
FIGS. 2A-B are isometric views of another example of an image capture device.
Figure 2B:
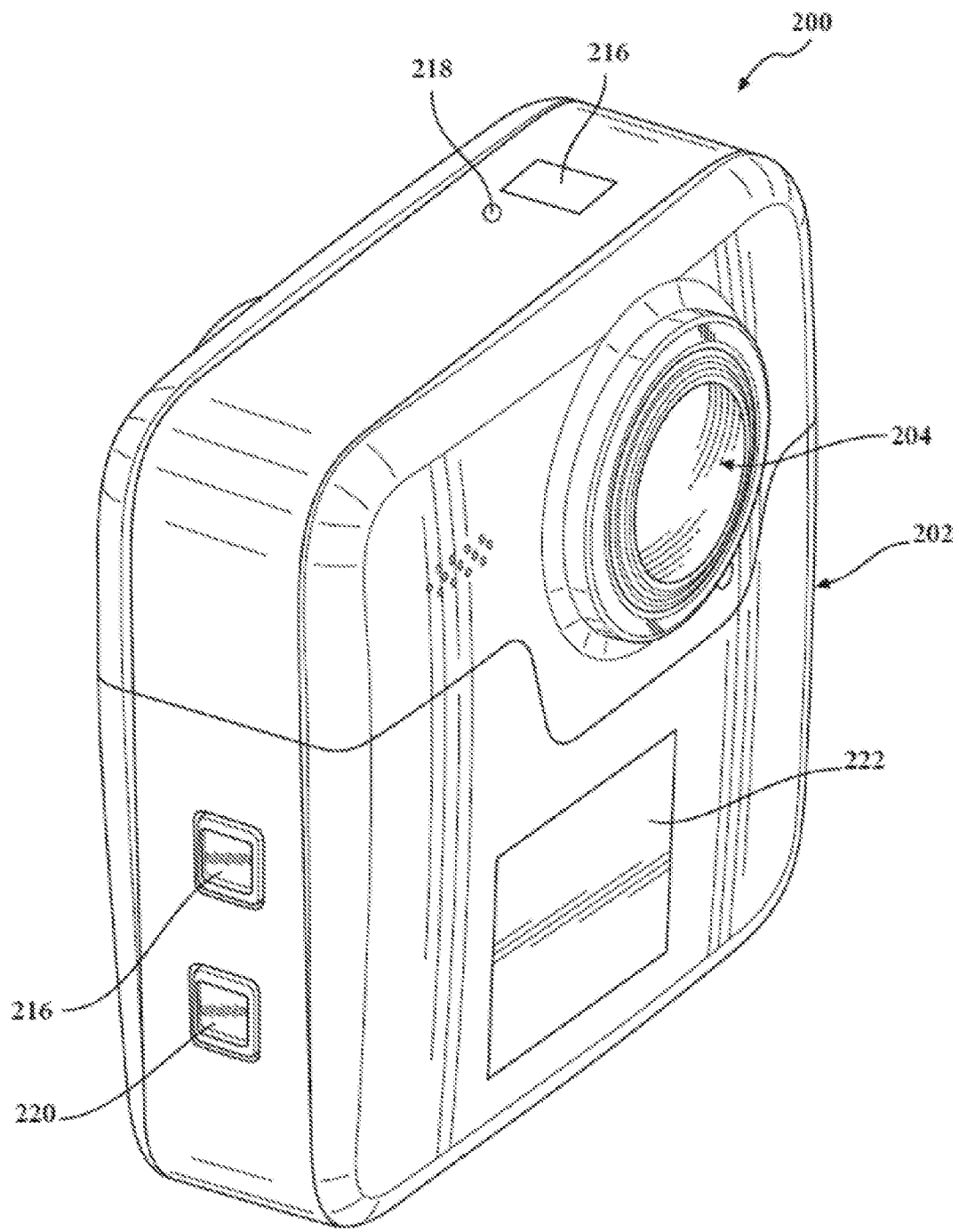

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features, such as interchangeable imaging modules, cold shoes, or hot shoes that add functional accessories, etc.

Figure 2C:
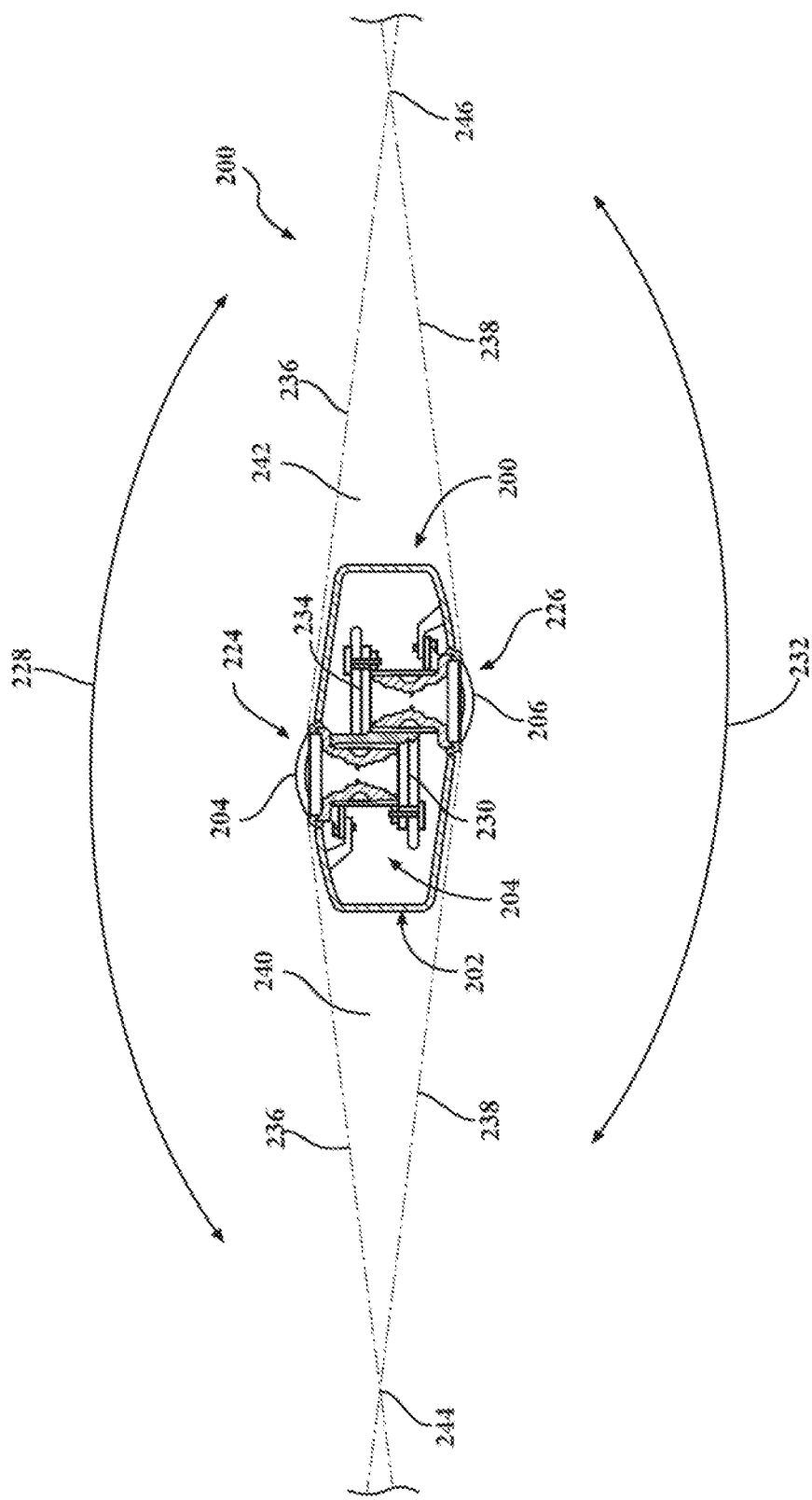
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

The image capture device 200 may be modular and/or configurable using the implementations described in this disclosure, such as the embodiments and implementations described in FIGS. 5-11 and may be used to implement some or all of the techniques described in this disclosure, such as the technique described in FIG. 12.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

The image capture system 300 may be modular and/or configurable using the implementations described in this disclosure, such as the embodiments and implementations described in FIGS. 5-11 and may be used to implement some or all of the techniques described in this disclosure, such as the technique described in FIG. 12.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or capture photo) received via the user interface 364 may be passed on to the image capture device 340 via the communications link 350.

The image capture system 330 may be modular and/or configurable using the implementations described in this disclosure, such as the embodiments and implementations described in FIGS. 5-11 and may be used to implement some or all of the techniques described in this disclosure, such as the technique described in FIG. 12.

Figure 4B:
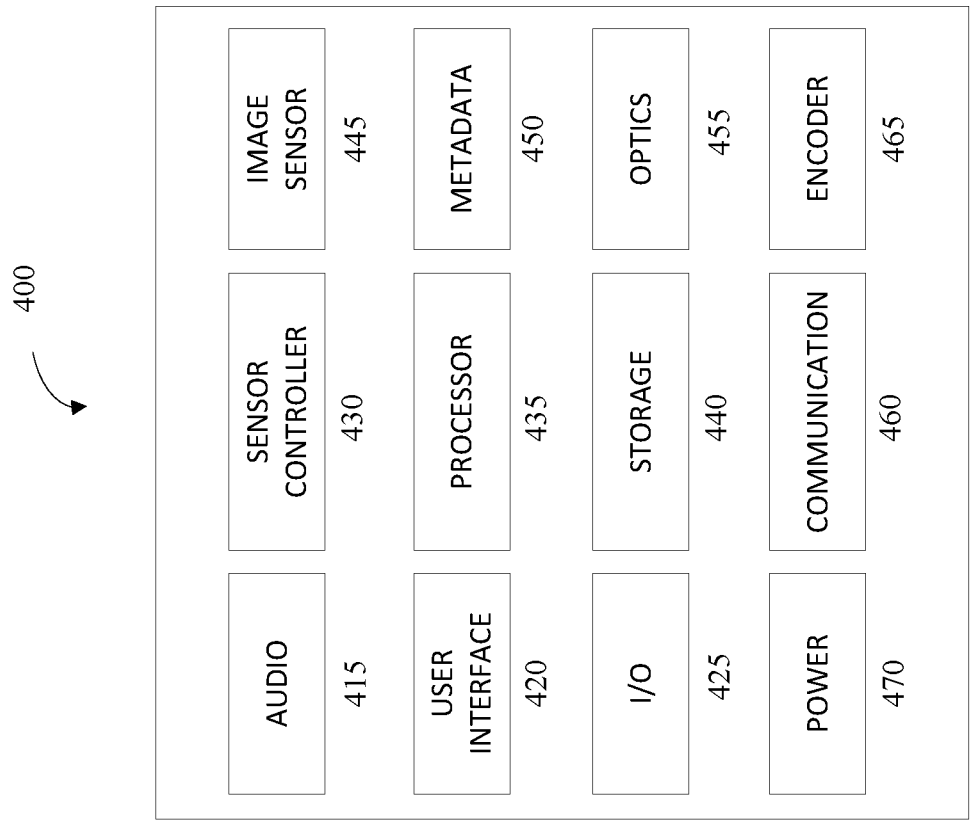
FIGS. 4A-B are a perspective view and a schematic representation of an image capture device.
Figure 4A:
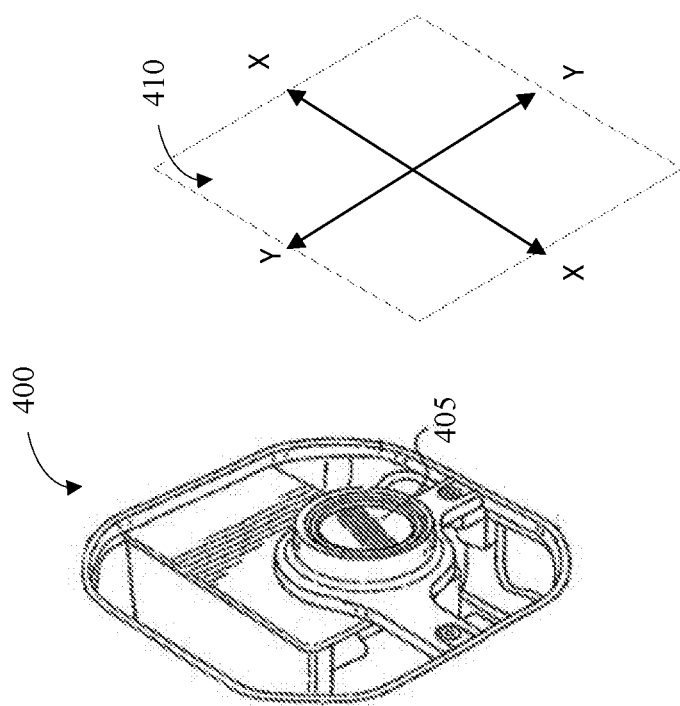

FIG. 4A is a perspective view of another example of an image capture device 400 together with an associated field-of-view and FIG. 4B is a schematic representation of the image capture device 400. The image capture device 400 includes one or more optical components or elements 405 with an associated field-of-view 410 that extends, for example, 90° in a lateral dimension X-X and 120° in a longitudinal dimension Y-Y. Dependent upon the capabilities of the particular optical component(s) 405, however, the extent of the field-of-view 410 may be varied (i.e., increased or decreased) in the lateral dimension or the longitudinal dimension. Suitable optical component(s) 405 may include one or more lenses, macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, spherical lenses, and perspective control lenses. In some image capture devices, multiple, overlapping fields of view are employed to increase the capability of the device, for example, by including two or more optical elements. For example, a first fisheye image may be a round or elliptical image, and may be transformed into a first rectangular image; a second fisheye image may be a round or elliptical image, and may be transformed into a second rectangular image; and the first and second rectangular images may be arranged side-by-side, which may include overlapping, and stitched together to form the equirectangular planar image.

As seen in FIG. 4 in addition to the optical component(s) 405, the image capture device 400 may further include an audio component 415, a user interface (UI) unit 420, an input/output (I/O) unit 425, a sensor controller 430, a processor 435, an electronic storage unit 440, an image sensor 445, a metadata unit 450, an optics unit 455, a communication unit 460, an encoder 465, and power system 470. Suitable examples of the image sensor 445 may include a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

During the processing of images, it is envisioned that the processor 435 may identify motion information, such as motion vectors, representing motion between the respective images and reference data. For example, the processor 435 may perform motion estimation to generate the motion information. The processor 435 may then output the processed images, for example, to a memory of the image capture device 400 for storage.

The image capture device 400 may be modular and/or configurable using the implementations described in this disclosure, such as the embodiments and implementations described in FIGS. 5-11 and may be used to implement some or all of the techniques described in this disclosure, such as the technique described in FIG. 12.

Figure 5:
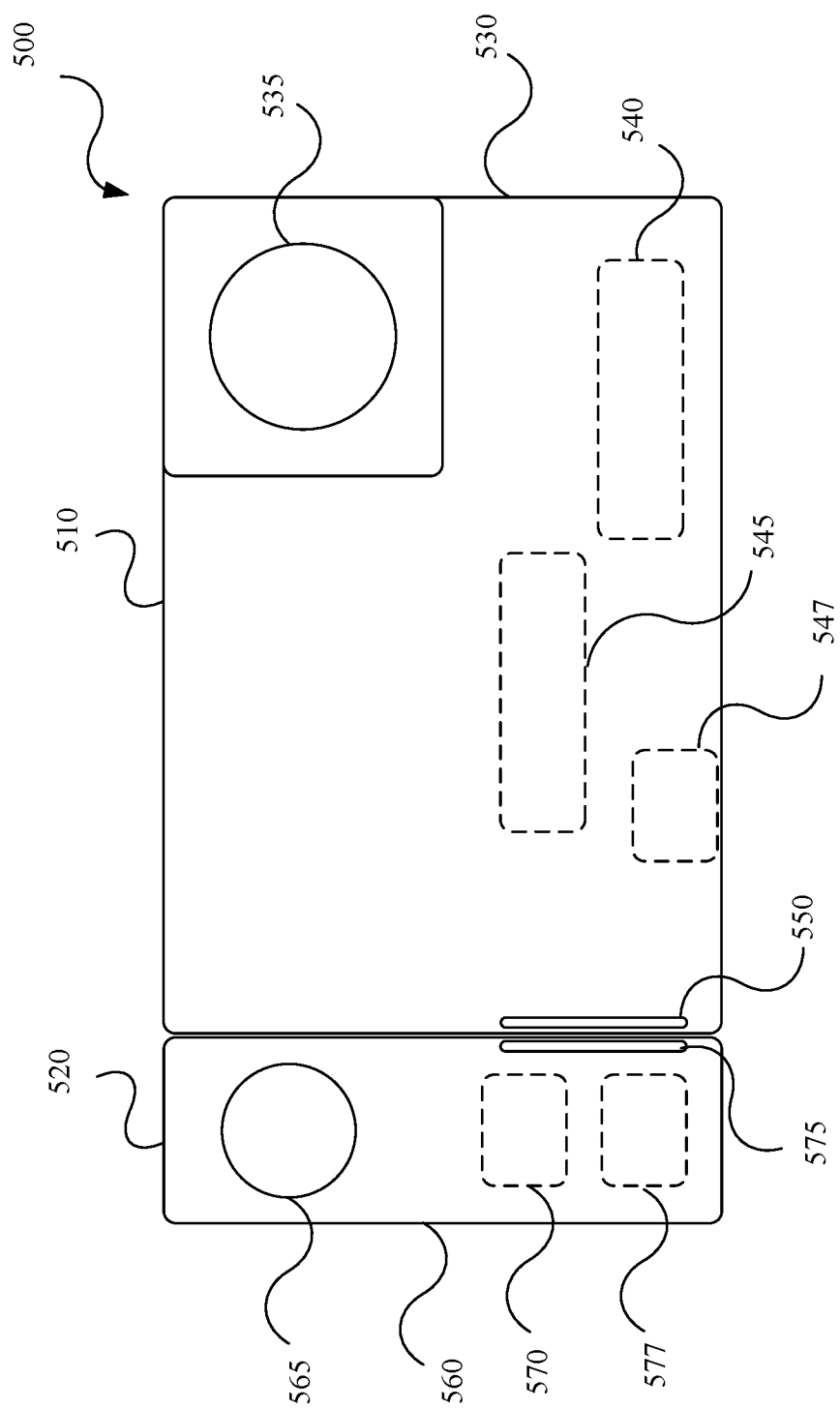
FIG. 5 is a diagram of an image capture system including an image capture device having an attached integrated sensor-optical component accessory in accordance with embodiments of this disclosure.

FIG. 5 is a diagram of an image capture system 500 including an image capture device 510 having an attached integrated sensor-optical component accessory 520. The integrated sensor-optical component accessory 520 includes a body 560, one or more optical components 565 structured on the body 560, one or more image sensors 570 internal to the body 560, and an interface mounting structure 575. The one or more image sensors 570 and the one or more optical components 565 may form an integrated sensor-optical component assembly of the integrated sensor-optical component accessory 520. Although shown as including a single sensor 570 and a single optical component 565 in the embodiment shown in FIG. 5, in alternate embodiments, the number of included sensors 570 and optical components 565 may be varied without departing from the scope of the present disclosure.

The one or more image sensors 570 may include any or all features and/or characteristics described with respect to FIGS. 1-4. For example, one or more image sensors 570 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

The one or more optical components 565 may include any or all features and/or characteristics described with respect to FIGS. 1-4. For example, the one or more optical components 565 may include one or more lenses, macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, perspective control lenses, and/or any other lens(es) and/or combinations thereof.

The interface mounting structure 575 may include mechanical clips, a detent assembly, slots, or the like that correspond to an interface mounting structure 550 included on the image capture device 510 as described herein. As further described herein, the interface mounting structure 575 may include electrical, optical and other like interfacing mechanisms to transfer data, provide power and the like between the image capture device 510 and the integrated sensor-optical component accessory 520. The interface mounting structure 550 and the interface mounting structure 575 may be any of the interfaces described herein, as applicable and appropriate.

In an implementation, the integrated sensor-optical component accessory 520 may draw power from the image capture device 510, for example, from a power source 547, such as a battery. In an implementation, the integrated sensor-optical component accessory 520 may draw power from an alternate power source 577 included on the integrated sensor-optical component accessory 520, e.g., one or more separate batteries. In an implementation, the integrated sensor-optical component accessory 520 may draw power from a combination of the above implementations or power sources.

In an implementation, the integrated sensor-optical component accessory 520 may include other sensors and/or devices such as microphones, processors, power supply, motion sensors, audio sensors, and the like.

The image capture device 510 includes a body 530, one or more optical components 535 structured on the body 530, one or more image sensors 540 internal to the body 530, a processor 545 internal to the body 530 and an interface mounting structure 550. In an implementation, the one or more optical components 535 structured on the body 530 and the one or more image sensors 540 are fixed with respect to the image capture device 510. The image capture device 510 may include any or all features and/or characteristics described with respect to FIGS. 1-4. Although shown as including a single sensor 540 and a single optical component 535 in the embodiment shown in FIG. 5, in alternate embodiments, the number of included sensors 540 and optical components 535 may be varied without departing from the scope of the present disclosure.

The one or more image sensors 540 may include any or all features and/or characteristics described with respect to FIGS. 1-4. For example, one or more image sensors 540 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

The one or more optical components 535 may include any or all features and/or characteristics described with respect to FIGS. 1-4. For example, the one or more optical components 535 may include one or more lenses, macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, perspective control lenses, and/or any other lens(es) and/or combinations thereof.

The interface mounting structure 550 may include mechanical clips, a detent assembly, slots, or the like that receive corresponding structure included on the integrated sensor-optical component accessory 520. As further described herein, the interface mounting structure 550 may include electrical, optical and other like interfacing mechanisms to transfer data, provide power and the like between the image capture device 510 and the integrated sensor-optical component accessory 520. The interface mounting structure 550 may facilitate the use of a variety of integrated sensor-optical component accessories 520.

In an implementation, data is communicated between the integrated sensor-optical component accessory 520 and the image capture device 510 when the integrated sensor-optical component accessory 520 and the image capture device 510 are connected. In an implementation, the integrated sensor-optical component accessory 520 and the image capture device 510 are physically connected via the interface mounting structure 575 and the interface mounting structure 550. In an implementation, the data transfer may be bi-directional. In an implementation, the volume of data flowing from the integrated sensor-optical component accessory 520 to the image capture device 510 may exceed the volume of data flowing from the image capture device 510 to the integrated sensor-optical component accessory 520.

In an implementation, the data may include integrated sensor-optical component accessory identification data or information, changes in shutter speed, exposure, and the like. In an implementation, the integrated sensor-optical component accessory identification data may be control data or information for use by the processor 545 to reconfigure operation and functionality of the image capture system 500 including control or operational control of the integrated sensor-optical component accessory 520 and the image capture device 510.

In an implementation, the integrated sensor-optical component accessory identification data may include lens shading, distortion, white balance, pixel defects, color, and chromatic aberration. Such characteristics may be assessed and image correction information may be determined therefor. For example, for each image sensor/optical component pair, the image correction information may include one or more of a lens shading correction table, a distortion correction table, a white balance correction table, a pixel defect table or map, a color correction table or matrix, or a chromatic aberration correction table. The one or more image correction information may be stored locally by the integrated sensor-optical component 520 and be transferred to the image capture device 510 for processing of image data received thereby. In an implementation, the integrated sensor-optical component accessory identification data may be stored on memory (such as for example storage 440 in FIG. 4) located in the integrated sensor-optical component accessory 520.

The integrated sensor-optical component accessory identification data stored by the integrated sensor-optical component accessory 520 may include various types of information associated with the integrated sensor-optical component accessory 520, such as the image correction information (described above), integrated sensor-optical component control information, and/or security information, which may be used by the image capture device 510. The image correction information (e.g., one or more image correction tables) may be used by the image capture device 510 when processing and/or storing image data. The image module control information may be used by the image capture device 510 for controlling operation of the integrated sensor-optical component accessory 520 with the image capture device 510. For example, the image module control information may include software programming enabling control of various functions of the integrated sensor-optical component accessory 520 not previously stored by the image capture device 510. For instance, the image capture device 510 may already include (e.g., be preprogrammed with) integrated sensor-optical component accessory control information for operation of an integrated sensor-optical component accessory 520 having certain configurations (e.g., specific combinations of primary sensor characteristics and primary lens characteristics), certain components, or certain features (e.g., mechanical zoom, sensors), but may not include image control information required for operation of other configurations, other components, or other features. Security information may include, for example, digital rights management (DRM) security protocols that permit use of the integrated sensor-optical component accessory 520 with the image capture device 510. The integrated sensor-optical component accessory information may be transferred from the integrated sensor-optical component accessory 520 and thereafter be stored by the image capture device 510 (e.g., a memory thereof), and thereafter be used by the image capture device 510 for controlling or operating the integrated sensor-optical component accessory 520. In an implementation, this information may be the identification data or a part thereof. In an implementation, this data may be used to reconfigure the processor, SoC, controller, image signal processor or image capture device for optimal operation with the integrated sensor-optical component accessory 520.

In an implementation, the interface mounting structure 550 and the interface mounting structure 575 may implement a wireless data connection, conductive power connection and a mechanical connection. For example, the mechanical connection mechanically connects the image capture device 510 to the integrated sensor-optical component accessory 520 to prevent physical separation therebetween, for example, by holding the image capture device 510 in a predetermined spatial relationship relative to the integrated sensor-optical component accessory 520. The wireless data connection provides wireless data transfer, such as transfer of image information (e.g., images frames of a video stream) from the integrated sensor-optical component accessory 520 to the image capture device 510. For example, the image information may include includes image frames having 4K resolution or more and captured at 30 frames per second or more.

The wireless data connection may be a close proximity, high speed data transfer system that provides data transmission without physical contact between wireless data transfer devices thereof. A conductive power connection transfers electrical power to the integrated sensor-optical component accessory 520 from the image capture device 510 via physical contact between conductive members, which is then used to power various electrical components of the integrated sensor-optical component accessory 520. The wireless data connection may also be referred to as a data connection, a wireless data link, a data link, a wireless data coupling, or a data coupling. The conductive power connection may also be referred to as a power connection, a conductive power link, a power link, a conductive power coupling, or a power coupling. The mechanical connection may also be referred to as a physical connection, a mechanical coupling, or a physical coupling. In some embodiments, a wired data connection may be provided instead of or in addition to the wireless data connection, for example, to transfer subsets or particular types of data (e.g., control instructions). Instead of or in addition to the conductive power connection, a wireless power connection may be provided (e.g., inductive power transfer).

The processor 545 may be a system-on-chip, image signal processor, a controller or combinations thereof which are configured for optimal performance based on identification data provided by the integrated sensor-optical component accessory 520. As described herein, the image capture device 510 may be calibrated based on identification data provided by the integrated sensor-optical component accessories 520. In an implementation, a user interface is configurable based on the identification data.

In an implementation, the processor 545 may be adapted and programmed to support multiple integrated sensor-optical component accessories 520 and product uses, such as, for example, hand-held applications, drone-based applications, and/or vehicle-based applications. The processor 545 may be configured for use with a variety of integrated sensor-optical component accessories 520. Each integrated sensor-optical component accessory 520 may include specific identification data or identifiers that may be communicated to the processor 545. The identification data may provide information concerning particular fields of view of specific optical components, image sensors, and the like. Once the integrated sensor-optical component accessory 520 is identified and processed by the processor 545, the processor 545 may execute a self-calibration based on the identification data. The image capture device 510 and the processor 545 may be configured or loaded with multiple firmware sets to facilitate the calibration process.

In an implementation, the processor 545 may reconfigure operation of the image capture device including the processor 545 to process image information captured via the integrated sensor-optical component accessory 520 instead of the one or more optical components 535 and the one or more image sensors 540 of the image capture device 510. In an implementation, image information from the one or more optical components 535 and the one or more image sensors 540 of the image capture device 510 may be ignored. In an implementation, the processor 545 may turn off or power down operation of the one or more optical components 535 and the one or more image sensors 540 of the image capture device 510.

In an implementation, the processor 545 may reconfigure operation of the image capture device including the processor 545 to process image information captured via the integrated sensor-optical component accessory 520 and image information captured by the one or more optical components 535 and the one or more image sensors 540 of the image capture device 510. In an implementation, image information from the integrated sensor-optical component accessory 520 and from the one or more optical components 535 and the one or more image sensors 540 of the image capture device 510 are processed appropriately, by an image processor, for example.

In an implementation, the processor 545 may reconfigure operation of the image capture device including the processor 545 to process image information captured via the integrated sensor-optical component accessory 520 and/or image information captured by the one or more optical components 535 and the one or more image sensors 540 of the image capture device 510 based on where and how the integrated sensor-optical component accessory 520 is connected to the image capture device 510. For example, the integrated sensor-optical component accessory 520 may be attached at different surfaces of the image capture device and each surface or interface port may include an attachment identifier that may be processed by the processor 545. In an implementation, mechanical mechanisms, electrical mechanisms, optical mechanisms and/or a combination of such mechanism may be used to provide, generate or otherwise inform the processor 545 of the attachment identifier. In an implementation, image information from the integrated sensor-optical component accessory 520 and from the one or more optical components 535 and the one or more image sensors 540 of the image capture device 510 are processed appropriately, by an image processor, for example.

In an implementation, the processor 545 may use the integrated sensor-optical component accessory identification information, attachment identifier, mounting information and/or a combination thereof to reconfigure functionality and/or operation of the processor 545 and the image capture device 510.

Figure 6:
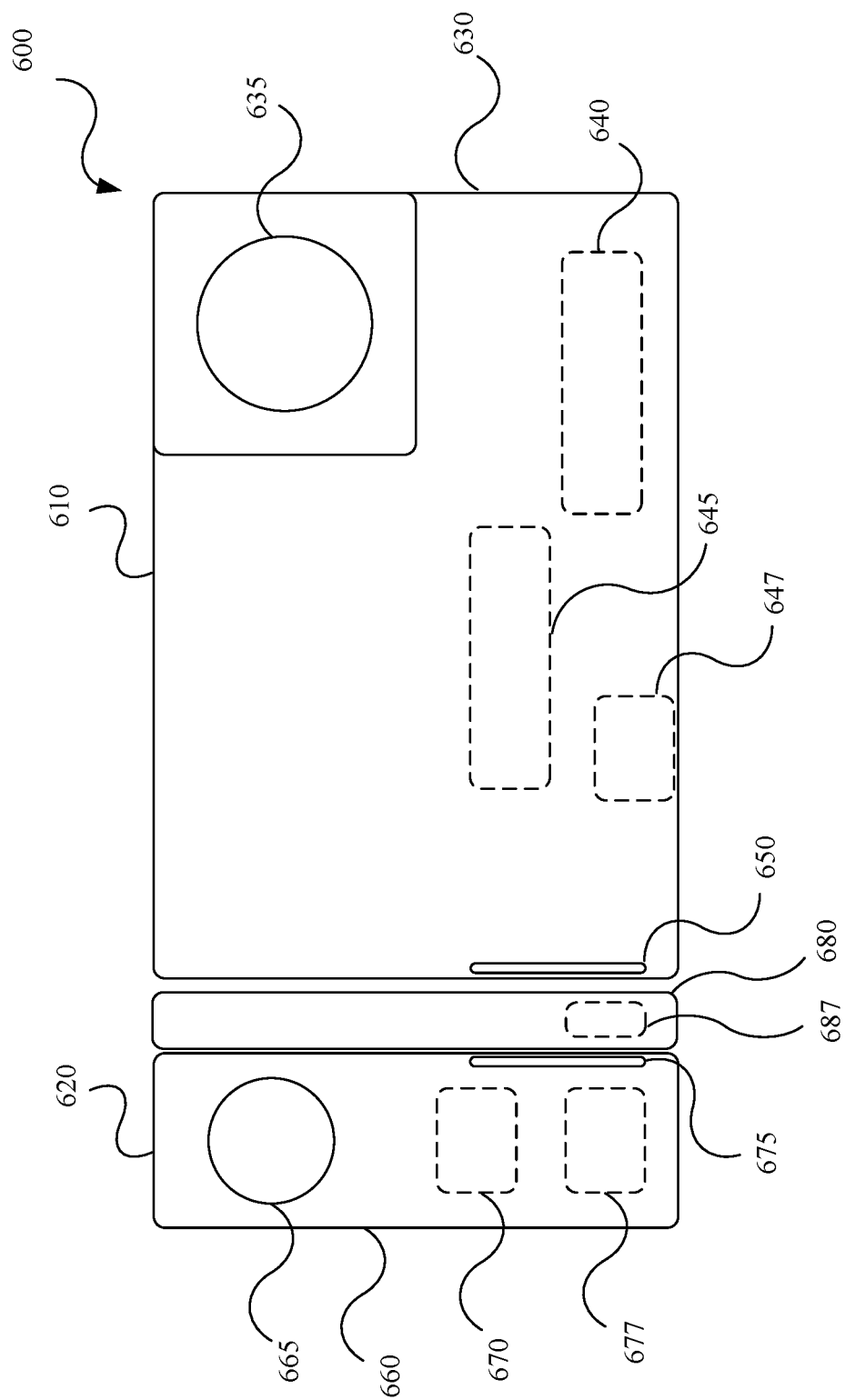
FIG. 6 is a diagram of an image capture system including an image capture device with an attached integrated sensor-optical component accessory using an interface structure or frame in accordance with embodiments of this disclosure.

FIG. 6 is a diagram of an image capture system 600 including an image capture device 610 with an attached integrated sensor-optical component accessory 620 using an interface structure or frame 680. The image capture device 610 and the integrated sensor-optical component accessory 620 may include any or all features and/or characteristics described with respect to FIGS. 1-5 and the description of the image capture device 610 and the integrated sensor-optical component accessory 620 is therefore summarized herein.

The integrated sensor-optical component accessory 620 includes a body 660, one or more optical components 665 structured on the body 660, one or more image sensors 670 internal to the body 660, and an interface mounting structure 675. The one or more image sensors 670 and the one or more optical components 665 may form an integrated sensor-optical component assembly of the integrated sensor-optical component accessory 620.

The image capture device 610 includes a body 630, one or more optical components 635 structured on the body 630, one or more image sensors 640 internal to the body 630, a processor 645 internal to the body 630 and an interface mounting structure 650. In an implementation, the one or more optical components 635 structured on the body 630 and the one or more image sensors 640 are fixed with respect to the image capture device 610. The image capture device 610 may include a power source 647.

In an implementation, attachment of the image capture device 610 and the integrated sensor-optical component accessory 620 may use the interface structure or frame 680. The interface structure 680 may provide mechanical cooperation with the image capture device 610 and electrical communication between the integrated sensor-optical component accessory 620 and the image capture device 610. In an implementation, the interface structure 680 may assist in data transfer between the image capture device 610 and the integrated sensor-optical component accessory 620. The interface structure 680 may include or be the implementations described in U.S. patent application Ser. No. 15/892,077, filed on Feb. 8, 2018, which is herein incorporated by reference.

In an implementation, the interface structure 680 may be adapted for electrical connection and signal communication between the image capture device 610 and the integrated sensor-optical component accessory 620 to facilitate the transfer of data and/or power between the image capture device 610 and the integrated sensor-optical component accessory 620. In an implementation, the interface structure 680 may a mounting structure that is configured and dimensioned for engagement/disengagement with the interface mounting structure 650 of the image capture device 610 to facilitate attachment/de-attachment of the integrated sensor-optical component accessory 620 to the image capture device 610.

In an implementation, the integrated sensor-optical component accessory 620 may draw power from the image capture device 610, for example, from a power source 647, such as a battery, which may be facilitated by the electrical connection established by the interface structure 680. In an implementation, the integrated sensor-optical component accessory 620 may draw power from an alternate power source 677 included on the integrated sensor-optical component accessory 620, e.g., one or more separate batteries. In an implementation, the integrated sensor-optical component accessory 620 may draw power from a power source 687 included on the interface structure 680. In an implementation, the integrated sensor-optical component accessory 620 may draw power from a combination of the above implementations or power sources.

Figure 7:
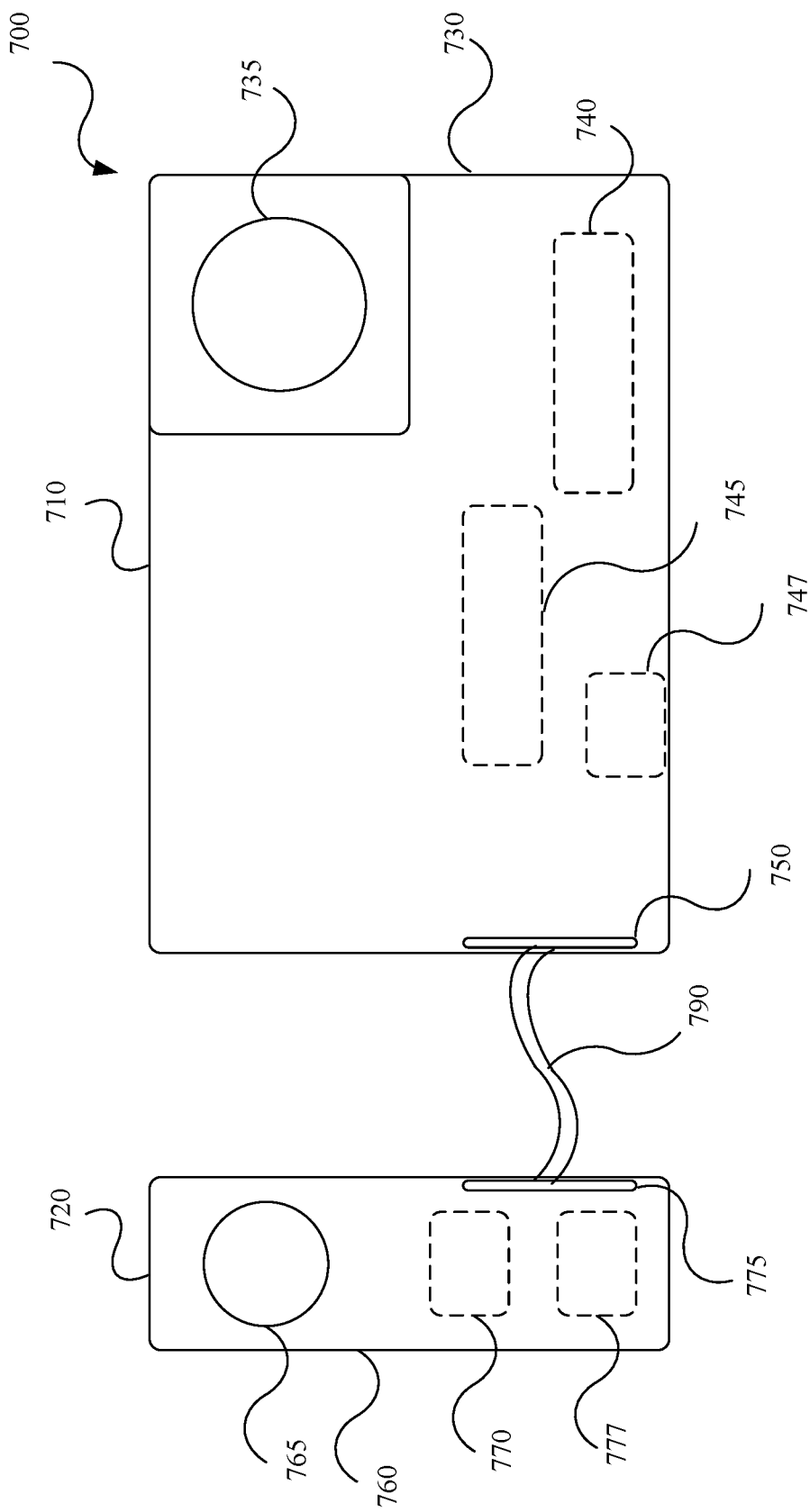
FIG. 7 is a diagram of an image capture system including an image capture device with an attached integrated sensor-optical component accessory using a cable in accordance with embodiments of this disclosure.

FIG. 7 is a diagram of an image capture system 700 including an image capture device 710 with an attached integrated sensor-optical component accessory 720 using a cable 790. The image capture device 710 and the integrated sensor-optical component accessory 720 may include any or all features and/or characteristics described with respect to FIGS. 1-6 and the description of the image capture device 710 and the integrated sensor-optical component accessory 720 is therefore summarized herein. The cable 790 may be any of a variety of data cables, video cables, audio cables, and/or combination thereof, and may be, but is not limited to, High-Definition Multimedia Interface (HDMI), IEEE 1394 FireWire, Digital Visual Interface (DVI), Universal Serial Bus (USB), Thunderbolt, DisplayPort, and includes all versions and types thereof.

The integrated sensor-optical component accessory 720 includes a body 760, one or more optical components 765 structured on the body 760, one or more image sensors 770 internal to the body 760, and an interface mounting structure 775. The one or more image sensors 770 and the one or more optical components 765 may form an integrated sensor-optical component assembly of the integrated sensor-optical component accessory 720.

The image capture device 710 includes a body 730, one or more optical components 735 structured on the body 730, one or more image sensors 740 internal to the body 730, a processor 745 internal to the body 730 and an interface mounting structure 750. In an implementation, the one or more optical components 735 structured on the body 730 and the one or more image sensors 740 are fixed with respect to the image capture device 710. The image capture device 710 may include a power source 747.

In an implementation, attachment of the image capture device 710 and the integrated sensor-optical component accessory 720 may use the cable 790 or any like connector. The cable 790 may provide electrical communication between the integrated sensor-optical component accessory 720 and the image capture device 710. In an implementation, the cable 790 may assist in data transfer between the image capture device 710 and the integrated sensor-optical component accessory 720.

In an implementation, the cable 790 may be adapted for electrical connection and signal communication between the image capture device 710 and the integrated sensor-optical component accessory 720 to facilitate the transfer of data and/or power between the image capture device 710 and the integrated sensor-optical component accessory 720. In an implementation, the cable 790 may be configured and dimensioned for engagement/disengagement with the interface mounting structure 750 and 775 to facilitate attachment/de-attachment of the integrated sensor-optical component accessory 720 to the image capture device 710.

In an implementation, the integrated sensor-optical component accessory 720 may draw power from the image capture device 710, for example, from a power source 747, such as a battery, which may be facilitated by the electrical connection established by cable 790. In an implementation, the integrated sensor-optical component accessory 720 may draw power from an alternate power source 777 included on the integrated sensor-optical component accessory 720, e.g., one or more separate batteries. In an implementation, the integrated sensor-optical component accessory 720 may draw power from a combination of the above implementations or power sources.

Figure 8:
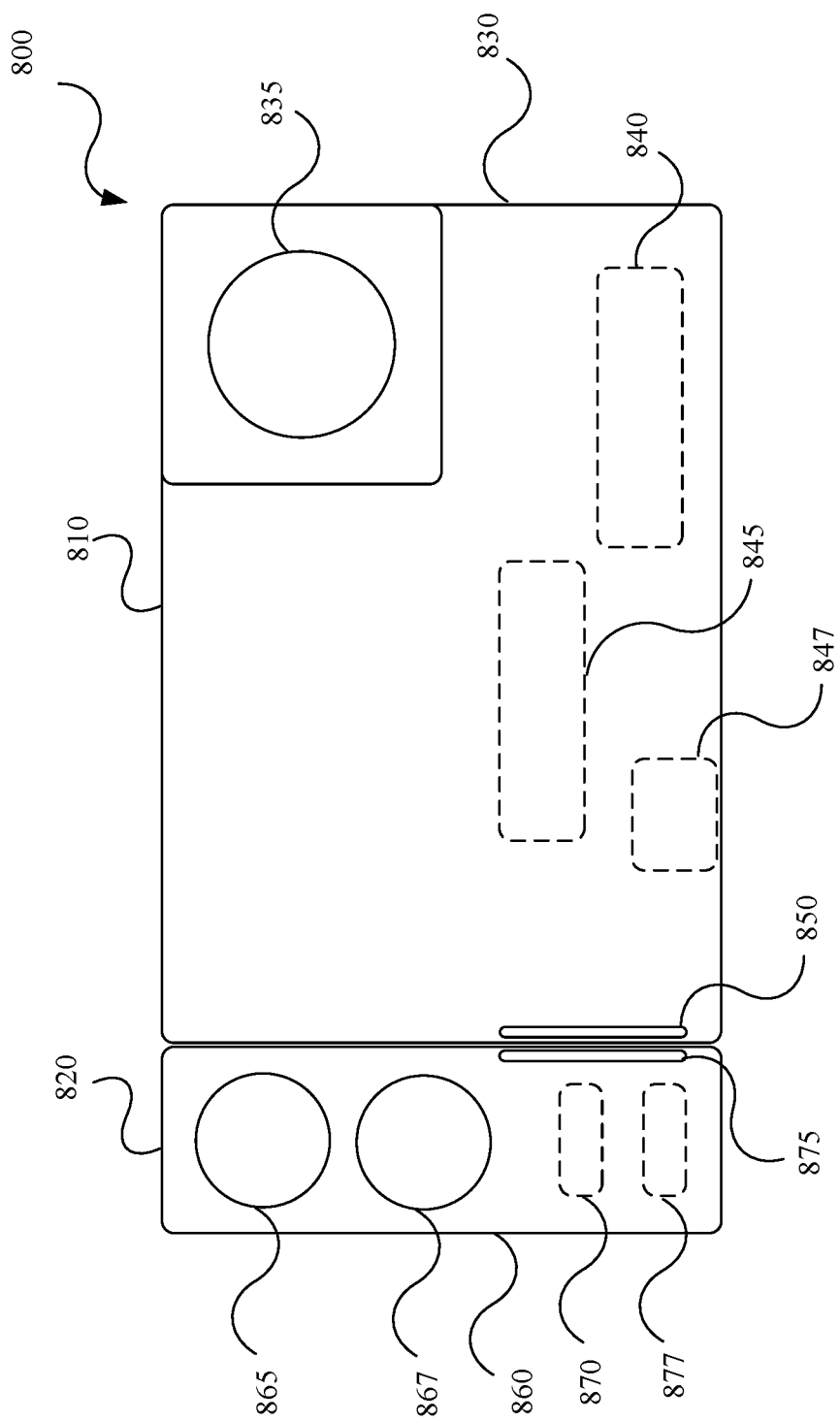
FIG. 8 is a diagram of an image capture system including an image capture device with an attached integrated sensor-optical component accessory with multiple sensor-optical components in accordance with embodiments of this disclosure.

FIG. 8 is a diagram of an image capture system 800 including an image capture device 810 with an attached integrated sensor-optical component accessory 820 with multiple sensor-optical components. The image capture system 800 may include any or all features and/or characteristics described with respect to FIGS. 1-7. The description of the image capture device 810 is therefore summarized herein and the description of the integrated sensor-optical component accessory 820 is expanded herein.

The integrated sensor-optical component accessory 820 includes a body 860, two or more optical components 865, 867 structured on the body 860, one or more image sensors 870 internal to the body 860, and an interface mounting structure 875. The one or more image sensors 870 and the two or more optical components 865, 867 may form an integrated sensor-optical component assembly of the integrated sensor-optical component accessory 820. The two or more optical components 865, 867 of the integrated sensor-optical component accessory 820 may be the same or different and may include any of the optical components and lenses described herein with respect to FIG. 5.

The image capture device 810 includes a body 830, one or more optical components 835 structured on the body 830, one or more image sensors 840 internal to the body 830, a processor 845 internal to the body 830 and an interface mounting structure 850. In an implementation, the one or more optical components 835 structured on the body 830 and the one or more image sensors 840 are fixed with respect to the image capture device 810. The image capture device 810 may include a power source 847.

As described herein, the processor 845 may reconfigure operation of the image capture device 810 including the processor 845 to process image information captured via one or more of the integrated sensor-optical component accessory 820, the one or more optical components 835 and the one or more image sensors 840 of the image capture device 810. In an implementation, the processor 845 may use the integrated sensor-optical component accessory identification information, mounting information and/or a combination thereof to reconfigure functionality and/or operation of the processor 845 and the image capture device 810.

Figure 9:
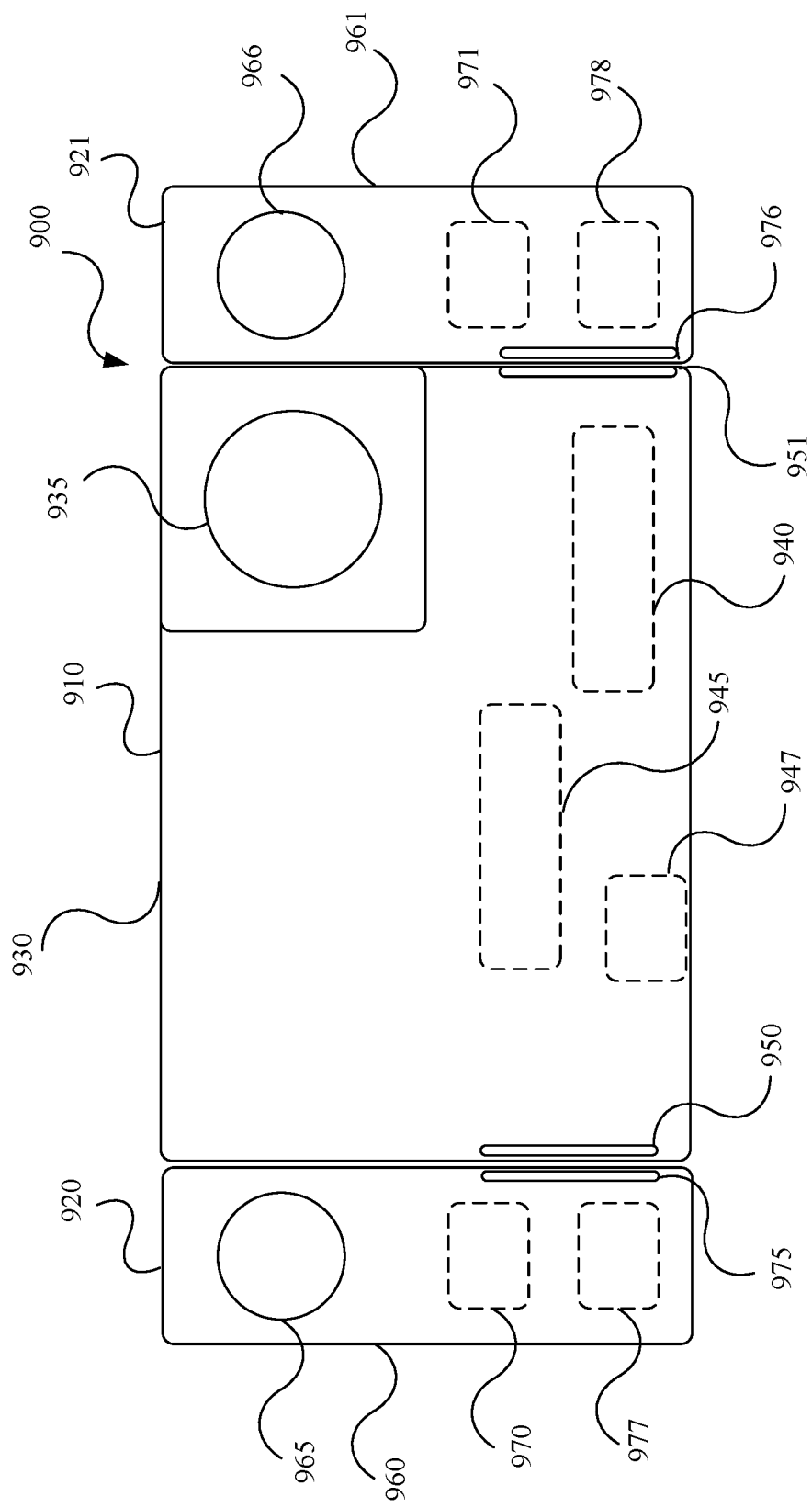
FIG. 9 is a diagram of an image capture system including an image capture device with multiple attached integrated sensor-optical component accessories in accordance with embodiments of this disclosure.

FIG. 9 is a diagram of an image capture system 900 including an image capture device 910 with multiple attached integrated sensor-optical component accessories 920, 921. The image capture system 900 may include any or all features and/or characteristics described with respect to FIGS. 1-8. The description of the image capture device 910 and the integrated sensor-optical component accessories 920, 921 is therefore expanded herein.

The integrated sensor-optical component accessories 920, 921 includes a body 960, 961, one or more optical components 965, 966 structured on the body 960, 961, one or more image sensors 970, 971 internal to the body 960, 961, and an interface mounting structure 975, 976. The one or more image sensors 970, 971 and the one or more optical components 965, 966 may form integrated sensor-optical component assemblies of the integrated sensor-optical component accessories 920, 921. The integrated sensor-optical component accessories 920, 921 may be the same or different and may include any of the optical components and lenses described herein with respect to FIG. 5.

The image capture device 910 includes a body 930, one or more optical components 935 structured on the body 930, one or more image sensors 940 internal to the body 930, a processor 945 internal to the body 930 and interface mounting structures 950, 951. In an implementation, the one or more optical components 935 structured on the body 930 and the one or more image sensors 940 are fixed with respect to the image capture device 910. The image capture device 810 may include a power source 847.

In an implementation, the integrated sensor-optical component accessory 920 may be attached to image capture device 910 via interface mounting structure 975 and interface mounting structure 950, and the integrated sensor-optical component accessory 921 may be attached to image capture device 910 via interface mounting structure 976 and interface mounting structure 951. The implementation is illustrative and an integrated sensor-optical component accessory may be attached to an image capture device using any applicable surface. In an implementation, more than two integrated sensor-optical component accessories may be attached. As stated, the attachment may be implemented using any of the implementations described herein with respect to FIGS. 1-8.

As described herein, the processor 945 may reconfigure operation of the image capture device 910 including the processor 945 to process image information captured via one or more of the integrated sensor-optical component accessories 920, 921, the one or more optical components 935 and the one or more image sensors 940 of the image capture device 910. In an implementation, the processor 945 may use the integrated sensor-optical component accessory identification information, mounting information and/or a combination thereof to reconfigure functionality and/or operation of the processor 945 and the image capture device 910.

FIG. 10 is a side view of a diagram of an image capture system 1000 including an image capture device 1010 with an attached integrated sensor-optical component accessory 1020. The image capture system 1000 may include any or all features and/or characteristics described with respect to FIGS. 1-9. The description of the image capture device 1010 and the integrated sensor-optical component accessory 1020 is therefore summarized herein. In this implementation, a center axis of the field of view (dashed arrow) of the image capture system 1000 and a center axis of the field of view (dashed-dotted arrow) of the integrated sensor-optical component accessory 1020 are in the same direction.

The integrated sensor-optical component accessory 1020 includes a body, one or more optical components 1065 structured on the body, one or more image sensors internal to the body, and an interface mounting structure. The one or more image sensors and the one or more optical components 1065 may form an integrated sensor-optical component assembly of the integrated sensor-optical component accessory 1020.

The image capture device 1010 includes a body 1030, one or more optical components 1035 structured on the body 1030, one or more image sensors 1040 internal to the body 1030, a processor 1045 internal to the body 1030 and an interface mounting structure. In an implementation, the one or more optical components 1035 structured on the body 1030 and the one or more image sensors 1040 are fixed with respect to the image capture device 1010.

As described herein, the processor 1045 may reconfigure operation of the image capture device 1010 including the processor 1045 to process image information captured via one or more of the integrated sensor-optical component accessories 1020, the one or more optical components 1035 and the one or more image sensors 1040 of the image capture device 1010. In an implementation, the processor 1045 may use the integrated sensor-optical component accessory identification information, mounting information and/or a combination thereof to reconfigure functionality and/or operation of the processor 1045 and the image capture device 1010. In an implementation, attachment of the integrated sensor-optical component accessory 1020 to the image capture device 1010 may result in the field of views being in the same direction.

FIG. 11 is a side view of a diagram of an image capture system 1100 including an image capture device 1110 with an attached integrated sensor-optical component accessory 1120 in opposing directions. The image capture system 1100 may include any or all features and/or characteristics described with respect to FIGS. 1-9. The description of the image capture device 1110 and the integrated sensor-optical component accessory 1120 is therefore summarized herein. In an implementation, a center axis of the field of view of the image capture system 1100 and a center axis of the field of view of the integrated sensor-optical component accessory 1120 are in different directions. In an implementation, the different directions may include having the center axis of the field of view of the image capture system 1100 be 90° or 180° apart from the center axis of the field of view of the integrated sensor-optical component accessory 1120. In an implementation, other separation angles may be used. In an implementation, a center axis of the field of view (dashed arrow) of the image capture system 1100 and a center axis of the field of view (dashed-dotted arrow) of the integrated sensor-optical component accessory 1120 are in opposing directions.

The integrated sensor-optical component accessory 1120 includes a body, one or more optical components 1165 structured on the body, one or more image sensors internal to the body, and an interface mounting structure. The one or more image sensors and the one or more optical components 1165 may form an integrated sensor-optical component assembly of the integrated sensor-optical component accessory 1120.

The image capture device 1110 includes a body 1130, one or more optical components 1135 structured on the body 1130, one or more image sensors 1140 internal to the body 1130, a processor 1145 internal to the body 1130 and an interface mounting structure. In an implementation, the one or more optical components 1135 structured on the body 1130 and the one or more image sensors 1140 are fixed with respect to the image capture device 1110.

As described herein, the processor 1145 may reconfigure operation of the image capture device 1110 including the processor 1145 to process image information captured via one or more of the integrated sensor-optical component accessories 1120, the one or more optical components 1135 and the one or more image sensors 1140 of the image capture device 1110. In an implementation, the processor 1145 may use the integrated sensor-optical component accessory identification information, mounting information and/or a combination thereof to reconfigure functionality and/or operation of the processor 1145 and the image capture device 1110. In an implementation, attachment of the integrated sensor-optical component accessory 1120 to the image capture device 1110 may result in the field of views being in different directions. In an implementation, attachment of the integrated sensor-optical component accessory 1120 to the image capture device 1110 may result in the field of views being in opposing directions. In an implementation, attachment of the integrated sensor-optical component accessory 1120 to the image capture device 1110 may result in the field of views which overlap. In an implementation, attachment of the integrated sensor-optical component accessory 1120 to the image capture device 1110 may result in a near 360° field of view.

FIG. 12 is a flow diagram of an example method 1200 for attaching an integrated sensor-optical component accessory to an image capture device in accordance with embodiments of this disclosure. The method 1200 includes: attaching 1210 an integrated sensor-optical component accessory to an image capture device; receiving 1220 integrated sensor-optical component accessory identification data by a processor or SoC on the image capture device; configuring 1230 the SoC and/or image capture device based on the received integrated sensor-optical component accessory identification data; and receiving 1240 data from at least the integrated sensor-optical component accessory after calibration is complete. The method may be implemented in any of the image capture systems described in FIGS. 5-11.

The method 1200 includes attaching 1210 an integrated sensor-optical component accessory to an image capture device. In an implementation, attachment may include mechanical coupling and electrical connectivity between the integrated sensor-optical component accessory and the image capture device. In an implementation, attachment may include mechanical coupling and electrical connectivity between the integrated sensor-optical component accessory, the image capture device, and an interface module. In an implementation, attachment may include the integrated sensor-optical component accessory receiving power from the image capture device, the interface module, alternative power source or a combination thereof. In an implementation, attachment may include engaging mounting structure on the image capture device with the engagement structure included on the integrated sensor-optical component accessory. In an implementation, attachment may include coupling the integrated sensor-optical component accessory and the image capture device via a cable. In an implementation, attachment may include coupling the integrated sensor-optical component accessory and the image capture device using a combination of wired and wireless technologies. In an implementation, attachment may include the integrated sensor-optical component accessory receiving power from the image capture device.

The method 1200 includes receiving 1220 integrated sensor-optical component accessory identification data by a processor or SoC on the image capture device. In an implementation, the processor may receive identification data from an integrated sensor-optical component accessory or from other components of the image capture device. In an implementation, the processor may receive attachment information indicating where and how the integrated sensor-optical component accessory is attached to the image capture device. For example, the attachment information may indicate which surface the integrated sensor-optical component accessory may be attached to. For example, the attachment information may indicate how the integrated sensor-optical component accessory is attached to the image capture device with respect to having same, different, non-overlapping, and overlapping fields of view with respect to the image capture device.

The method 1200 includes configuring 1230 the processor and/or image capture device based on the received integrated sensor-optical component accessory identification data. In an implementation, the processor may account for the attachment information in determining the configuration. In an implementation, the processor may process the identification data and configure the SoC and the image capture device for operation or optimal operation with the attached integrated sensor-optical component accessory. In an implementation, an image signal processor or controller may be configured for operation or optimal operation between the image capture device and the integrated sensor-optical component accessory. In an implementation, a user interface on the image capture device may be configured for operation between the image capture device and the integrated sensor-optical component accessory.

The method 1200 includes receiving 1240 image data from the integrated sensor-optical component accessory after configuration is complete. In an implementation, the processor may signal, for example via an audio or visual signal, that configuration is complete, and the image capture device is now ready to use. In an implementation, the processor may process image data from the integrated sensor-optical component accessory and ignore image data from the image capture device (by turning off or powering down the sensor and optical component of the image capture device, for example). In an implementation, the processor may process image data from the integrated sensor-optical component accessory and image data from the image capture device.

In general, an image capturing system includes an integrated sensor-optical component accessory configured to capture image information and an image capturing device. The image capturing device includes a body, an image sensor internal to the body, the image sensor configured to capture image information, an optical component structured on the body, the optical component configured to direct light to the image sensor, and a processor configured to process selected image information. The image capturing device and the processor are configurable based on identification data received from the integrated sensor-optical component accessory when the integrated sensor-optical component accessory is releasably attached to the image capturing device. In an implementation, the image capturing system further includes another integrated sensor-optical component accessory configured to capture image information, where the image capturing device and the processor are configurable based on identification data received from the integrated sensor-optical component accessory and the another integrated sensor-optical component accessory when the integrated sensor-optical component accessory and the integrated sensor-optical component accessory are releasably attached to the image capturing device. In an implementation, the processor is further configurable based on attachment information, wherein the attachment information indicates where and how the integrated sensor-optical component accessory is attached to the image capturing device. In an implementation, the image capturing device further includes a user interface, the user interface configurable based on the identification data and the attachment data. In an implementation, the integrated sensor-optical component accessory is further configured to wirelessly transmit the image information and the identification data to the image capturing device. In an implementation, the image capturing device including a first mounting structure and the integrated sensor-optical component accessory including a second mounting structure, wherein the first mounting structure and the second mounting structure are configured and dimensioned for releasable attachment of the integrated sensor-optical component accessory with the image capturing device and provide mechanical coupling and electrical connectivity between the integrated sensor-optical component accessory and the image capturing device. In an implementation, the integrated sensor-optical component accessory is configured to draw power from the image capturing device. In an implementation, the integrated sensor-optical component accessory includes a first integrated sensor-optical component accessory and a second integrated sensor-optical component accessory and the processor is further configurable to select and process image data from the first integrated sensor-optical component accessory and the second integrated sensor-optical component accessory and power down the image sensor and the optical component of the image capturing device. In an implementation, the selected image information is from the integrated sensor-optical component accessory and the processor is configurable to ignore the image information from the image capturing device. In an implementation, the selected image information is from the integrated sensor-optical component accessory and the processor is configurable to turn off the image sensor and the optical component of the image capturing device. In an implementation, the selected image information is from the integrated sensor-optical component accessory and the image capturing device. In an implementation, a center axis of a field of view of the integrated sensor-optical component accessory and a center axis of a field of view of the image capturing device are in different directions. In an implementation, a center axis of a field of view of the integrated sensor-optical component accessory and a center axis of a field of view of the image capturing device are in opposing directions. In an implementation, a field of view of the integrated sensor-optical component accessory and a field of view of the image capturing device are one of non-overlapping or overlapping. In an implementation, the image capturing system further includes an interface, the interface configured to be in mechanical cooperation with the image capturing device and in electrical communication with the integrated sensor-optical component accessory, where the interface is configured to assist in data transfer between the integrated sensor-optical component accessory and the image capturing device, and where the integrated sensor-optical component accessory is configured to draw power from at least one of the interface or the image capturing device. In an implementation, the integrated sensor-optical component accessory is configured to store the identification data that is transferred to the image capturing device and the image capturing device operates the integrated sensor-optical component accessory according to the identification data.

In general, an image capturing apparatus includes an image capturing device. The image capturing device including an image sensor, an optical component configured to direct light to the image sensor, a processor for processing selectable image information, and a first mounting structure. The image capturing apparatus further includes an integrated sensor-optical component accessory including an image sensor configured to capture image information, and an optical component configured to direct light to the image sensor, where the image sensor is fixed in relation to the optical component, and a second mounting structure, where the processor is configurable based on identification data received from the integrated sensor-optical component accessory and attachment information when the integrated sensor-optical component accessory is releasably attached to the image capturing device using at least the first mounting structure and the second mounting structure. In an implementation, the selectable image information includes the image information from the integrated sensor-optical component accessory and operationally ignores the image capture device.

In general, a method of using an image capturing system includes releasably attaching an integrated sensor-optical component accessory to an image capturing device, receiving integrated sensor-optical component accessory control information at the image capture device from the integrated sensor-optical component accessory, where the integrated sensor-optical component accessory control information is different for different integrated sensor-optical component accessories, configuring a processor in the image capture device and the image capture device based on the integrated sensor-optical component accessory control information, and processing selected image data based on the integrated sensor-optical component accessory control information. In an implementation, the method further includes operationally ignoring the image capture device.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capturing system, comprising:
    an integrated sensor-optical component accessory configured to capture image information, and
    an image capturing device including:
    a body;
    an image sensor internal to the body, the image sensor configured to capture image information;
    an optical component structured on the body, the optical component configured to direct light to the image sensor; and
    a processor configured to process selected image information,
    wherein the image capturing device and the processor are configurable based on identification data received from the integrated sensor-optical component accessory when the integrated sensor-optical component accessory is releasably attached to the image capturing device.

2. The image capturing system of claim 1, further comprising:
    another integrated sensor-optical component accessory configured to capture image information, wherein the image capturing device and the processor are configurable based on identification data received from the integrated sensor-optical component accessory and the another integrated sensor-optical component accessory when the integrated sensor-optical component accessory and the integrated sensor-optical component accessory are releasably attached to the image capturing device.

3. The image capturing system of claim 1, wherein the processor is further configurable based on attachment information, wherein the attachment information indicates where and how the integrated sensor-optical component accessory is attached to the image capturing device.

4. The image capturing system of claim 3, the image capturing device further comprising:
    a user interface, the user interface configurable based on the identification data and the attachment data.

5. The image capturing system of claim 1, wherein the integrated sensor-optical component accessory is further configured to wirelessly transmit the image information and the identification data to the image capturing device.

6. The image capturing system of claim 1, the image capturing device including a first mounting structure and the integrated sensor-optical component accessory including a second mounting structure, wherein the first mounting structure and the second mounting structure are configured and dimensioned for releasable attachment of the integrated sensor-optical component accessory with the image capturing device and provide mechanical coupling and electrical connectivity between the integrated sensor-optical component accessory and the image capturing device.

7. The image capturing system of claim 6, wherein the integrated sensor-optical component accessory is configured to draw power from the image capturing device.

8. The image capturing system of claim 1, wherein the integrated sensor-optical component accessory includes a first integrated sensor-optical component accessory and a second integrated sensor-optical component accessory and the processor is further configurable to select and process image data from the first integrated sensor-optical component accessory and the second integrated sensor-optical component accessory and power down the image sensor and the optical component of the image capturing device.

9. The image capturing system of claim 1, wherein the selected image information is from the integrated sensor-optical component accessory and the processor is configurable to ignore the image information from the image capturing device.

10. The image capturing system of claim 1, wherein the selected image information is from the integrated sensor-optical component accessory and the processor is configurable to turn off the image sensor and the optical component of the image capturing device.

11. The image capturing system of claim 1, the selected image information is from the integrated sensor-optical component accessory and the image capturing device.

12. The image capturing system of claim 1, wherein a center axis of a field of view of the integrated sensor-optical component accessory and a center axis of a field of view of the image capturing device are in different directions.

13. The image capturing system of claim 1, wherein a center axis of a field of view of the integrated sensor-optical component accessory and a center axis of a field of view of the image capturing device are in opposing directions.

14. The image capturing system of claim 1, wherein a field of view of the integrated sensor-optical component accessory and a field of view of the image capturing device are one of non-overlapping or overlapping.

15. The image capturing system of claim 1, further comprising:

an interface, the interface configured to be in mechanical cooperation with the image capturing device and in electrical communication with the integrated sensor-optical component accessory, wherein the interface is configured to assist in data transfer between the integrated sensor-optical component accessory and the image capturing device, and wherein the integrated sensor-optical component accessory is configured to draw power from at least one of the interface or the image capturing device.

16. The image capturing system of claim 1, wherein the integrated sensor-optical component accessory is configured to store the identification data that is transferred to the image capturing device and the image capturing device operates the integrated sensor-optical component accessory according to the identification data.

17. An image capturing apparatus, comprising:
an image capturing device including:
an image sensor;
an optical component configured to direct light to the image sensor;
a processor for processing selectable image information; and
a first mounting structure; and
an integrated sensor-optical component accessory including:
an image sensor configured to capture image information; and
an optical component configured to direct light to the image sensor, wherein the image sensor is fixed in relation to the optical component; and
a second mounting structure, wherein the processor is configurable based on identification data received from the integrated sensor-optical component accessory and attachment information when the integrated sensor-optical component accessory is releasably attached to the image capturing device using at least the first mounting structure and the second mounting structure.

18. The image capturing apparatus of claim 17, wherein the selectable image information includes the image information from the integrated sensor-optical component accessory and operationally ignores the image capture device.

19. A method of using an image capturing system, comprising:
releasably attaching an integrated sensor-optical component accessory to an image capturing device;
receiving integrated sensor-optical component accessory control information at the image capture device from the integrated sensor-optical component accessory, wherein the integrated sensor-optical component accessory control information is different for different integrated sensor-optical component accessories;
configuring a processor in the image capture device and the image capture device based on the integrated sensor-optical component accessory control information; and
processing selected image data based on the integrated sensor-optical component accessory control information.

20. The method of claim 19, the method further comprising:
operationally ignoring the image capture device.

* * * * *